(12) United States Patent
Ozzello et al.

(10) Patent No.: US 10,450,965 B2
(45) Date of Patent: Oct. 22, 2019

(54) FUEL METERING UNIT FOR TURBINE ENGINE

(71) Applicant: Safran Power Units, Toulouse (FR)

(72) Inventors: Guylain Ozzello, Moissy-Cramayel (FR); Pascal Rolland, Moissy-Cramayel (FR)

(73) Assignee: SAFRAN POWER UNITS, Toulouse (FR)

( * ) Notice: Subject to any disclaimer, the term of this patent is extended or adjusted under 35 U.S.C. 154(b) by 245 days.

(21) Appl. No.: 15/691,066

(22) Filed: Aug. 30, 2017

(65) Prior Publication Data
US 2018/0066591 A1  Mar. 8, 2018

(30) Foreign Application Priority Data

Sep. 2, 2016  (FR) ...................................... 16 58171

(51) Int. Cl.
*F02C 9/26* (2006.01)
*F02C 7/228* (2006.01)
(Continued)

(52) U.S. Cl.
CPC .............. *F02C 9/263* (2013.01); *F02C 7/228* (2013.01); *F02C 7/232* (2013.01); *F02C 9/32* (2013.01)

(58) Field of Classification Search
CPC .......... F02C 7/228; F02C 7/232; F02C 9/263; F02C 9/32; Y10T 137/86509
(Continued)

(56) References Cited

U.S. PATENT DOCUMENTS

| 4,164,962 A | 8/1979 | Soderberg |
| 5,711,145 A * | 1/1998 | Perkey ..................... F02C 7/228 |
| | | 60/39.281 |

(Continued)

FOREIGN PATENT DOCUMENTS

| EP | 1906091 A2 | 4/2008 |
| EP | 2497923 A2 | 9/2012 |

(Continued)

OTHER PUBLICATIONS

Preliminary Research Report and Written Opinion received for French Application No. 1658171, dated Apr. 18, 2017, 8 pages (1 page of French Translation Cover Sheet and 7 page of original document).

*Primary Examiner* — William H Rodriguez
*Assistant Examiner* — Henry Ng
(74) *Attorney, Agent, or Firm* — Womble Bond Dickinson (US) LLP

(57) ABSTRACT

The invention relates to a fuel metering and distribution unit (10) which comprises in particular a slide valve (20) and a set of slots (41) configured with geometries, dimensions and positions such that:

in a first range of displacement of the slide valve, the flow area (31) which feeds the outlet port of the start-up ramp is progressively opened with the displacement of the slide valve (20), while the area (41) of the set of slots which feeds the outlet port of the main ramp is closed, then, in a second range of displacement of the slide valve (20), the area (41) of the set of slots which feeds the outlet port (42) of the main ramp is progressively opened with the displacement of the slide valve, while the flow area (31) which feeds the outlet port of the start-up ramp is kept open, the outlet port (42) of the main
(Continued)

ramp thus being able to receive a portion of the total metered flow rate at the flow area (31) feeding the outlet port of the start-up ramp.

9 Claims, 5 Drawing Sheets

(51) Int. Cl.
*F02C 7/232* (2006.01)
*F02C 9/32* (2006.01)

(58) Field of Classification Search
USPC ................................. 137/625.12; 251/205
See application file for complete search history.

(56) References Cited

U.S. PATENT DOCUMENTS

| | | | | |
|---|---|---|---|---|
| 5,732,730 A | * | 3/1998 | Shoemaker | F02C 7/232 137/115.14 |
| 6,092,546 A | * | 7/2000 | Lebrun, IV | F02C 7/228 137/118.06 |
| 8,578,967 B2 | * | 11/2013 | Vinski | F02C 7/232 137/625.48 |
| 2007/0245744 A1 | * | 10/2007 | Dooley | F01D 21/06 60/772 |
| 2008/0178596 A1 | * | 7/2008 | Brettes | F02C 7/232 60/740 |
| 2008/0245074 A1 | | 10/2008 | Oda et al. | |
| 2009/0320937 A1 | * | 12/2009 | Arnett | G05D 16/16 137/535 |
| 2014/0165571 A1 | * | 6/2014 | Vertenoeuil | F02C 7/232 60/734 |
| 2014/0345694 A1 | * | 11/2014 | Ballard | F02C 9/263 137/1 |
| 2017/0363016 A1 | * | 12/2017 | Selfridge | F02C 7/232 |
| 2018/0045121 A1 | * | 2/2018 | Cadman | F02C 9/263 |

FOREIGN PATENT DOCUMENTS

| | | |
|---|---|---|
| FR | 3010141 A1 | 3/2015 |
| FR | 3017414 A1 | 8/2015 |

\* cited by examiner

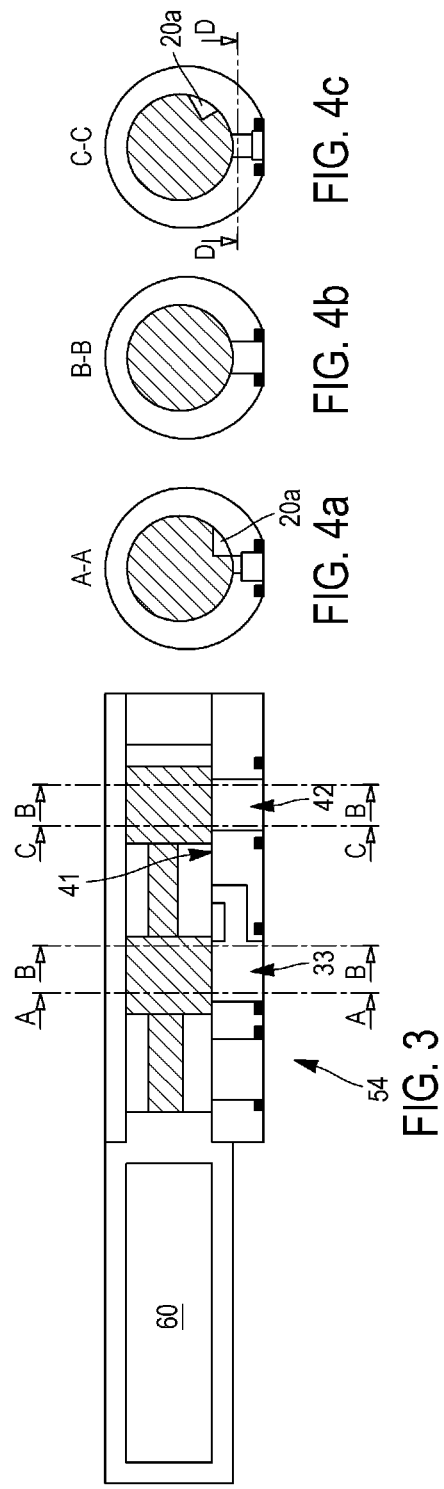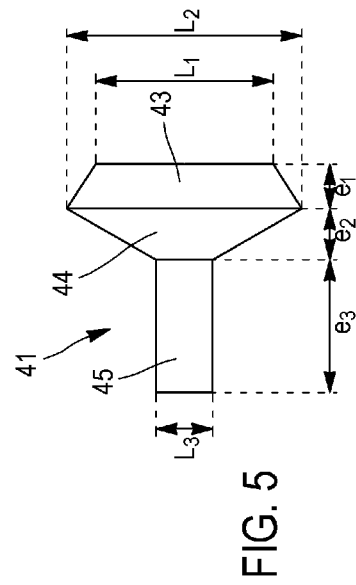

FUEL METERING UNIT FOR TURBINE ENGINE

TECHNICAL FIELD OF THE INVENTION

The present invention relates to the field of fuel systems of turbine engines, and more particularly the fuel metering systems required for start-up and for feeding a combustion chamber of the turbine engine, upstream of the injection devices consisting of a plurality of start-up injectors and main fuel injectors.

The invention relates more precisely to injection systems with dual fuel injection circuits, which comprise a pilot injection ramp or start-up ramp, delivering a constant fuel flow rate optimized for low power settings, as well as a peripheral injection ramp or main ramp which delivers an intermittent fuel flow rate optimized for high power settings. These injection systems were developed to allow better adaptation of the injection of air and of fuel to the different operating settings of the combustion chambers and particularly during start-up phases.

PRIOR ART

A conventional fuel system, located upstream of a combustion chamber of a turbine engine, can comprise the following elements mentioned here in the fuel flow direction from upstream to downstream: a fuel reservoir for storing fuel, a low pressure pump BP providing for feeding fuel emerging from the reservoir, a fuel filtering unit, a high pressure pump HP, a unit metering the total fuel flow rate delivered to the injectors, usually called an FMU (fuel metering unit), delivering at its outlet a total fuel flow rate possibly distributed downstream between several injection ramps, a fuel feed circuit possibly carrying out this distribution, and a set of fuel injectors arranged on a combustion chamber of the turbine engine to which said fuel feed circuit leads.

In the case of fuel systems provided with several sets of injectors, for example a ramp of start-up injectors and a ramp of main injectors, the fuel is delivered to these two sets of injectors in a non-simultaneous fashion, depending on the power setting of the turbine engine. For example, during start-up of the turbine engine, only the start-up injector ramp is fed with fuel, so as to obtain sufficient pressure allowing a good atomization of the low start-up flow rate, which allows the firing of the combustion chamber and keeping it fired. Thereafter, as soon as the fuel coming from the start-up injectors is burning regularly and satisfactorily, fuel is also supplied to the main injectors which complete the start-up injection, when the fuel demand of the turbine engine increases.

One known solution for accomplishing this deferred feeding of the start-up and main ramps, based on the same fuel flow rate pressurized by the high pressure pump and metered by a metering unit, consists of controlling the opening of the circuit supplying the main ramp using a distributing valve. In the closed position of said distributing valve, only the start-up ramp is fed by the total flow rate metered by the metering unit, and after the opening of the valve (controlled by the increased pressure induced by the increase of the flow rate required by the machine), the main ramp is also fed. Such an architecture of the fuel system has, however, the disadvantage of causing a considerable dispersion in terms of unit flow rate injected per injector, that is, the volume flow rate observed at the outlet of a fuel injection nozzle, between the start-up injectors and the main injectors. The use of a distributing valve, without an additional feed regulator, to control fuel feed of the main ramp, does not allow the precise control of the distribution of the total flow rate delivered by the metering unit between the start-up injectors and the main injectors. With this architecture, the distribution of the fuel flow rate between the injection ramps is solely a function of the performance of the distributing valve and of the permeability of the ramps.

To avoid the appearance of temperature heterogeneities in the combustion chamber, likely to impact the lifetime of the hot portions, the designer must ensure that the fuel injectors are distributed equidistantly at the inlet of the combustion chamber, but also that the divergence in unit flow rate between the injectors of the start-up ramp and the injectors of the main ramp is as low as possible. A value of the maximum divergence of 10% over the set of injectors constitutes a criterion known to a person skilled in the art. It is observed, however, that with systems with a metering unit and a distributing valve, operating according to the principle previously described, the maximum divergence between the unit flow rates of the start-up and main injectors is much greater than 10% over a large range of fuel flow rate delivered at the outlet of the high-pressure pump.

An implementation for a fuel system for a turbine engine is proposed in document FR 3017414, filed in the name of the Applicant, suitable for the case where the injection of fuel into the combustion chamber must occur in a deferred manner on a start-up ramp and a main ramp, allowing the total flow rate of fuel to be distributed between the two ramps. This fuel system comprises in particular, downstream of a metering unit for the total fuel flow rate (fuel metering unit), a valve for dividing the total flow rate between a feed circuit of the start-up ramp and a feed circuit of the main ramp. In one embodiment, the division of this total flow rate occurs by the axial displacement of a movable slide valve provided with slots allowing the intake area of the pipe leading to the start-up ramp as well as the intake area of the pipe leading to the main ramp to be adjusted. The slide valve can be controlled by a servo-valve type system.

This system, as well as other systems of the prior art, implementing similar flow rate division units, have the advantage of allowing a fine adjustment of the relationship between the fuel flow rates delivered to the start-up and main ramps, through controlling the relationship between the corresponding intake areas. This solution requires however the addition of an additional device within the fuel system, that is, a separate flow rate division valve for the fuel metering unit and the feed circuits of the injection ramps. This therefore introduces complexity and additional implementation costs, as well as, crucially in the field of aeronautical turbine engines, additional use of space.

Moreover, solutions have already been identified in the prior art for carrying out the metering of an entering fuel flow rate as well as its sharing over several fuel outlets. For example, the system presented in document U.S. Pat. No. 4,164,962 does indeed accomplish these two steps, by the association of two valves in series in the same enclosure. This device, however, aims at a systematically equal distribution of the metered flow rate between the outlets, which is not suitable for all the configurations of injection ramps for obtaining a uniform unit flow rate between all the injectors, and the implementation of two valves in series introduces additional complexity and variability of control.

PRESENTATION OF THE INVENTION

One of the goals of the invention is to propose a fuel metering unit integrated with the fuel system which allows better provision of the fuel in the combustion chamber than with the solutions of the prior art.

Another goal of the invention is to allow control of the injector unit flow rate, that is, the volume flow rate provided by each of the fuel injection nozzles to the combustion chamber.

In particular, according to one aspect, the invention aims to propose a solution allowing the most uniform injector unit flow rate possible at the outlet of the injectors of the start-up ramp as well as at the outlet of the main ramp.

Another goal is also to reduce as much as possible the duration of the transition phase during which the injectors of the start-up ramp and those of the main ramp have unit flow rates which are not uniform.

Yet another goal of the invention is to limit the use of space and the complexity of the system.

The invention, for its part, proposes a fuel metering and distribution unit, capable of controlling the fuel feed of a start-up injection ramp and of a main injection ramp in a combustion chamber of a turbine engine, including a multi-outlet metering device (with servo-valve or direct drive valve technology) comprising in a sleeve:
  a movable slide valve (driven, depending on the technology of the metering device, in translation or in rotation by an actuator and controlled by a control current coming from a computer of the turbine engine),
  a feed port for the fuel flow rate to be distributed at least between the start-up injection ramp and the main injection ramp (and also serving, in the case of a dual-stage servo-valve, for feeding the first control stage thereof),
  a first outlet port feeding the start-up ramp through a flow area on a span of the slide valve,
  a regulator regulating the pressure differential between this outlet port and the feed port, so as to obtain, at the flow area, a metered total flow rate that is a function of a control current,
  a second outlet port feeding the main ramp.

In particular, the second outlet port is fed through a set of slots which is situated on a span of the slide valve other than that where the flow area of the first outlet port feeding the start-up ramp is situated. The second outlet port receives a portion of the total metered fuel flow rate at the flow area feeding the first outlet port.

The set of slots corresponding to the second outlet port is more or less open depending on the position of the slide valve, so that the flow area defined by said set of slots varies and the distribution of flow rate between the start-up ramp and the main ramp varies as a function of the control current. Thus, for example, by adjusting the position of the slide valve (and therefore adjusting the metered flow rate), the offset between the spans of the slide valve and the axial position of the set of slots, the shape of the slots and if applicable the differences in permeabilities between the two ramps, it is possible to cause the second flow area to vary in order to control the distribution of flow rate.

The differences in permeabilities between the two ramps are in particular linked to the fact that, on the start-up ramp, strong pressure is desired during start-up so as to have a small drop size, while on the main ramp, a compromise is sought between, on the one hand, the necessity of limiting the pressure in the pump so as to increase its lifetime, and on the other hand the necessity of avoiding the appearance of hot spots.

In this manner, the first set of slots regulates the totality of the injected flow rate.

The slide valve and the set of slots can in particular be configured with geometries, dimensions and positions such that:
  in a first range of displacement of the slide valve, the flow area which feeds the outlet port of the start-up ramp is progressively opened with the displacement of the slide valve, while the area of the set of slots which feeds the outlet port of the main ramp is closed,
  then, in a second range of displacement of the slide valve, the area of the set of slots which feeds the outlet port of the main ramp is progressively opened with the displacement of the slide valve, and supplies the main ramp a portion of the metered flow rate at the flow area feeding the outlet port of the start-up ramp, while the flow area which feeds the outlet port of the start-up ramp is kept open.

Advantageously and without limitation, the feeding by the first outlet port of the set of slots can be ensured by an intake area located between the flow area of the first set of outlets and the set of slots, so that said two sections are in fluid communication in the second range of displacement of the slide valve defined earlier,
the feeding of the set of slots then being ensured by a diversion branch extending between said intake area and the first outlet port feeding the start-up ramp.

Said diversion branch and said intake area in combination allow the second outlet port of the main ramp to be fed with a portion of the total metered flow rate at the flow area of the first outlet port, even though the flow area for the first outlet port and the set of slots for the second outlet port are situated on different spans of the slide valve of the multi-outlet metering device.

In one embodiment, in particular, the slide valve and the set of slots are configured with geometries, dimensions and positions such that the divergence between the unit flow rate of the injectors of the start-up ramp and that of the injectors of the main ramp is less than 10% beyond a given total fuel flow rate threshold.

Likewise, according to yet another aspect, the slide valve and the set of slots are configured with geometries, dimensions and positions suitable for maintaining a minimum pressure at the inlet of the start-up injection ramp when the main injection ramp begins its opening.

The minimum pressure is 2.5 bars for example, or greater (preferably 5 bars or more).

According to yet another advantageous aspect, the invention proposes in particular a fuel metering unit wherein the main orifice has a specific geometry aiming to delimit the successive subsequent zones along the stroke of the slide valve on its axis:
  one zone with an increasing flow rate gain as the orifice opens,
  one zone with a decreasing flow rate gain,
  one zone where the flow rate increases linearly as a function of the displacement of the slide valve along its axis.

The invention also relates to a fuel system for a turbine engine comprising a metering unit of the proposed type, as well as a turbine engine comprising a combustion chamber and such a fuel system.

PRESENTATION OF THE FIGURES

Other features, goals and advantages of the present invention will appear more clearly upon reading the detailed description below which describes an embodiment of the invention, as well as viewing the following non-limiting figures.

FIG. 1 shows schematically the architecture of a fuel system feeding a start-up ramp and a main ramp, wherein a metering unit conforming to a possible embodiment of the invention can be implemented;

FIG. 2 details the configuration of a dual-outlet servo-valve according to one possible embodiment of the invention, in a configuration where neither the start-up injection ramp, nor the main injection ramp are fed;

FIG. 3 illustrates another possible servo-valve configuration, wherein the slide valve is of the rotating type;

FIGS. 4a to 4c are section views along lines A-A, B-B and C-C;

FIG. 5 illustrates the geometry of a main orifice of a metering unit conforming to a possible embodiment of the invention;

Figure 6:
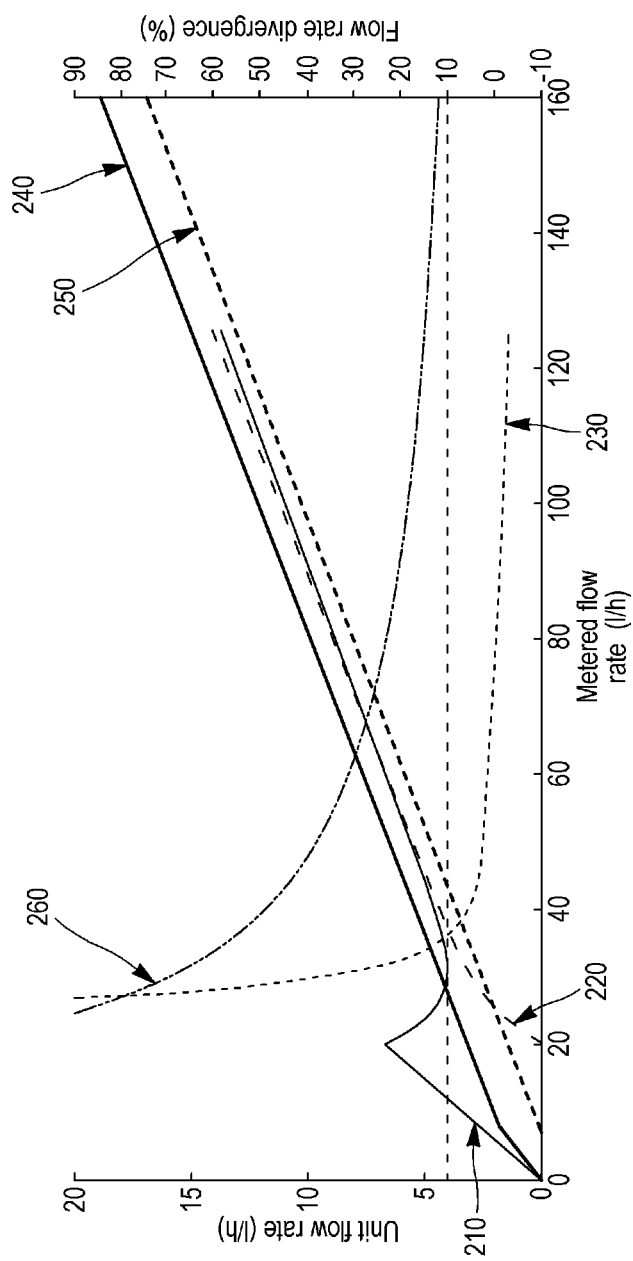
Figure 7:
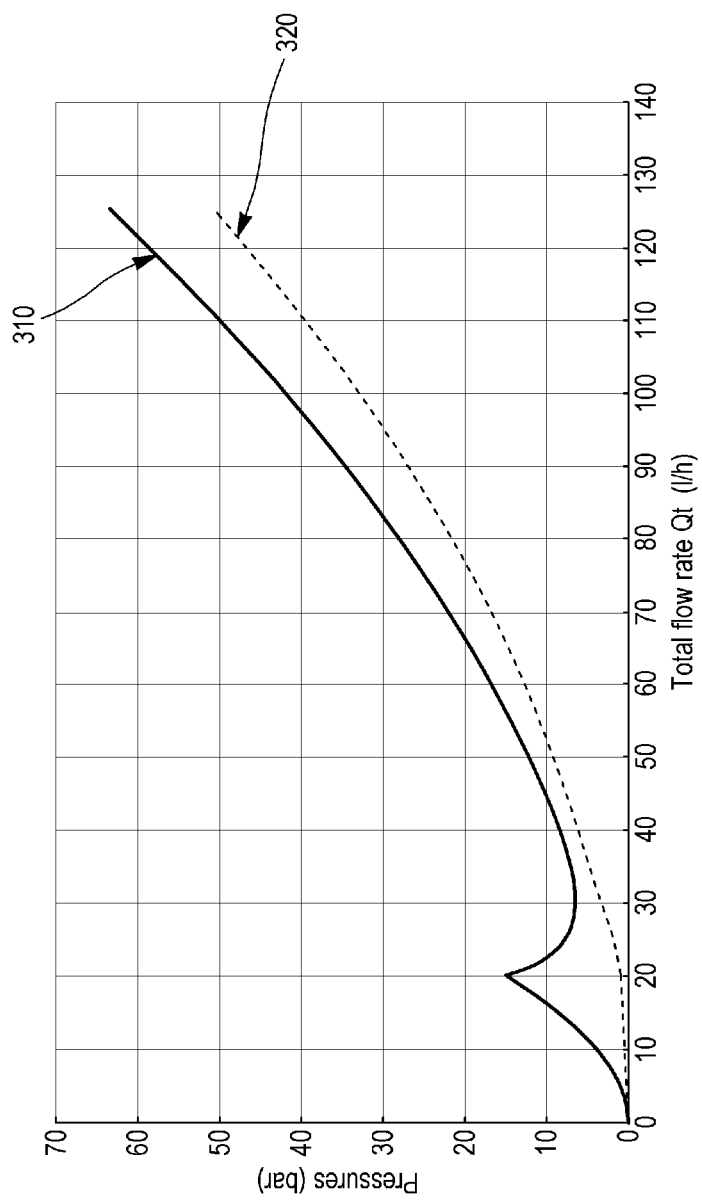

FIG. 6 compares graphically the rate of dispersion of the unit injector flow rate obtained for a fuel system architecture of the prior art, and for a fuel system architecture conforming to a possible embodiment of the invention, over a total metered fuel flow rate extending from 0 to 160 L/h;

Finally, FIG. 7 shows in graphical form the evolution, for the same fuel system, of the pressures measured at the inlet of the start-up ramp and at the inlet of the main ramp, over a total metered fuel flow rate of 0 to 140 L/h.

DETAILED DESCRIPTION OF ONE EMBODIMENT

Figure 1:
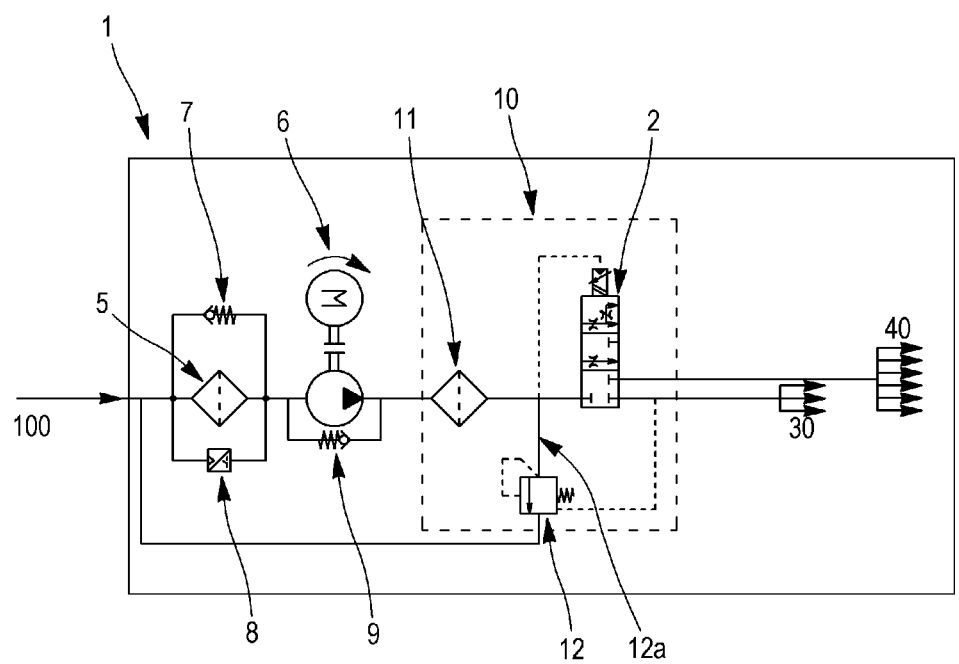

The fuel system 1 shown in FIG. 1 comprises, from upstream to downstream in the fuel flow direction,
a fuel reservoir not shown here;
a low pressure pump not shown here, suitable for pressurizing the fuel from the reservoir and supplying a fuel flow 100 at the inlet of the system;
a fuel filtering device 5, equipped with a pre-clogging indicator 8 to eliminate suspended matter from the flow, and also provided with a valve 7 allowing the filter to be short-circuited if necessary;
a high pressure electric pump (or one driven by the turbine engine via a relay box) 6 for delivering a fuel flow at high pressure at the inlet of the metering unit, with an overpressure valve 9 protecting the system against potential overpressures;
a metering unit 10, fed with fuel by the high pressure pump, comprising a self-cleaning filter 11, a dual-outlet servo-valve 2 the structure whereof is detailed hereafter and leading to the fuel feed circuit of the combustion chamber, and a differential pressure regulator 12;
a fuel feed circuit of the combustion chamber, comprising a start-up ramp 30 equipped here with three injectors, and a main ramp 40 equipped here with six injectors.

The servo-valve 2 (FIG. 2) takes, at its pressure inlet 54, a portion of the total fuel flow supplied by the electric pump 6, the other portion being bypassed by the differential pressure regulator 12 toward the inlet of the pump (diversion 12a in FIG. 1).

The metered flow rate feeds selectively:
on the one hand, through an outlet port 33, the start-up injection ramp 30 and
on the other hand, through an outlet port 42, the main injection ramp 40.

The differential pressure regulator 12 regulates a quasi-constant pressure difference at the limits of the metering orifice of the servo-valve and bypasses the excess flow rate delivered by the pump to the inlet thereof.

The start-up ramp 30 is suitable for supplying a fuel flow continuously to the combustion chamber during the operation of the engine. It ensures in particular the triggering of the combustion process in the chamber during firing of the engine. The main ramp 40 is suitable for supplying an intermittent flow of fuel, designed to complete the flow rate supplied by the start-up ramp 30 and supply the combustion process. The activation of the main ramp 40 depends on the power setting of the turbine engine.

Figure 2:
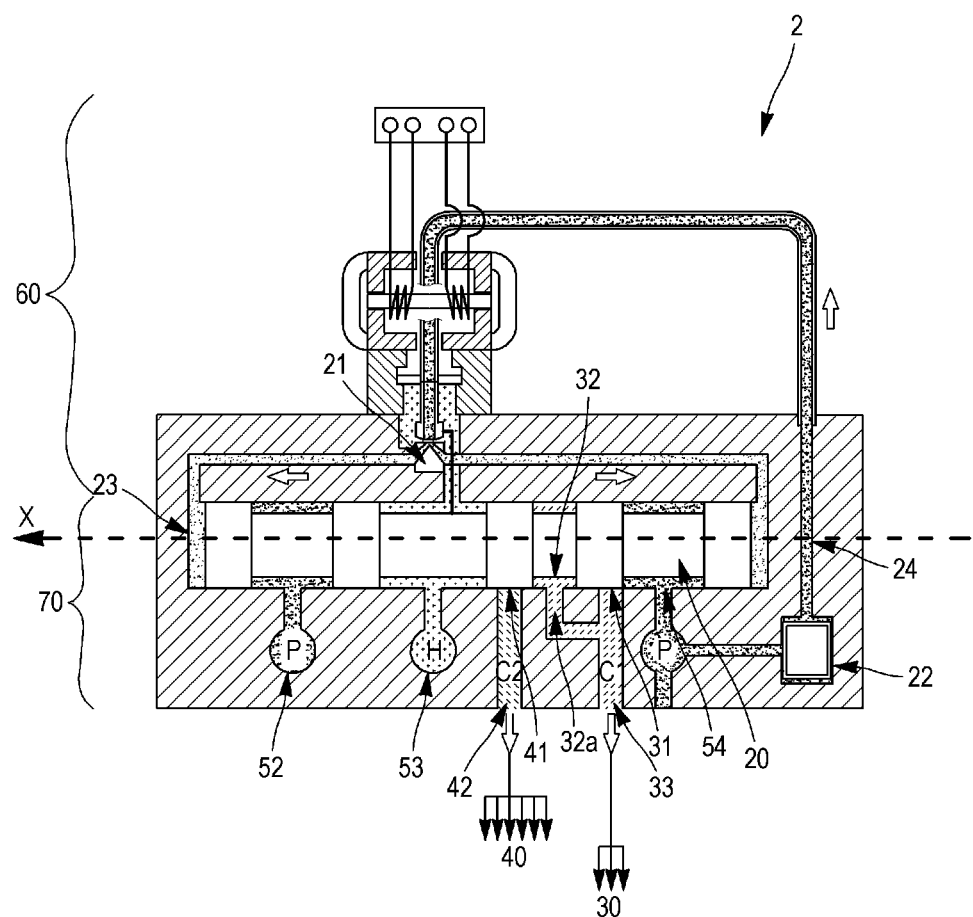

More particularly, the dual-outlet servo-valve shown in FIG. 2 comprises, in a sleeve (linear in this particular case), an axial displacement slide valve 20, the stroke whereof on its axis in a direction X adjusts flow areas 31, 41 at the inlet respectively of the outlet ports 33 and 42. These flow areas 31, 41 are situated on two different spans of the slide valve of the slide valve 20 sleeve.

As will be detailed later, the flow area 41 is defined by a set of slots with variable dimensions and shapes selected to have the unit flow rate of the start-up ramp 30 coincide with that of the main ramp 40. The area 31 can be a conventional rectangular section or also consist of a set of slots with variable dimensions and shapes.

A diversion branch 32a extends between the outlet port 31 and an intake area 32 interposed between the areas 31 and 41. When the outlet port 33 is fed and the flow area 41 is opened by the slide valve 20, the diversion branch 32a feeds the main orifice 42 (second outlet port) if the latter is itself opened by the slide valve 20, by means of the set of slots 41, with a portion of the total metered flow rate at the flow area 31.

The flow rate Q passing through a fuel flow area is a function, on the one hand, of a proportionality coefficient Ks which depends in particular on the surface area of said flow area, and on the other hand on the pressure difference ΔP between the upstream and downstream portions of this flow area, according to the law $Q=Ks*\sqrt{\Delta P}$.

The pressure differential at the limits of the area 31 being regulated by the pressure regulator 12, the totality of the flow rate is metered via this flow area, the second flow area 41 collecting a portion of this total flow area by means of the flow area 32 and the diversion branch 32a, to route it to 40.

By adjusting the intake areas (or flow areas) 31 and 41, the slide valve 20 adjusts the fuel flow rates observed at the outlets 33 and 42.

The servo-valve 2 operates according to the modalities known to a person skilled in the art.

It has a control stage 60, wherein an electrically controlled torque motor creates a mechanical action on a vane 21. It also has a power stage 70 accomplishing the action expected of the system on the fuel flows and the flow rates. By the variation of its position in a direction parallel to the direction X, the vane 21 generates a differential pressure on the sides 23, 24 of the slide valve, and thus causes the activation of the side valve 20 on its axis.

The power stage 70 comprises pressure inlets 52, 54 and a return pressure 53, the portion of the flow rate feeding the first servo-valve stage being processed by a filter 22. The pressure inlet 52 constitutes the feed point in the fuel flow system to be metered (as well as the flow rate of the first stage) and to be distributed between the ramps 30, 40.

The movable slide valve 20 is capable of taking several configurations depending on its position in the direction X, thus regulating the flow areas 31, and 41 and their character, passing or not, for the fuel flow feeding the inlet 54.

In a first configuration, which is that shown in FIG. 2, the area 31 and the area 41 are obstructed by the slide valve 20. Thus, in this first configuration, the injection ramps 30 and 40 are not fed.

When the slide valve 20 is displaced axially to the left in the direction X, it progressively frees the area 31. In a first phase, the orifice 41 remains obstructed: fuel circulates only through the outlet port 33 which feeds the start-up ramp 30. In addition, the fact that the flow area of the orifice 31 can vary as a function of the axial displacement of the slide valve 20 allows the flow rate delivered to the start-up ramp 30 to vary.

As the displacement of the slide valve continues, the flow area of the orifice 41 is progressively opened. In this configuration, the three orifices 31, 32 and 41 are passing for the fuel flow, and the flow area 32 is, on the one hand, in direct fluid communication with the orifice 41, and on the other hand in fluid communication with the orifice 31 by means of the diversion branch 32a. Thus, the total fuel flow passes through the start-up orifice 31, then is divided into two flows. The first flow reaches the outlet port 33 and therefore feeds the start-up ramp 30, and the second flow runs through the diversion channel 32a, then through the flow area 41 to reach the outlet port 42 and the main ramp 40. The two ramps 30 and 40 are therefore fed.

During a firing sequence for the engine of the turbine engine, the slide valve 20 thus passes first from the first configuration to the second, during a start-up phase. During this phase, the issue is to supply fuel at a sufficiently elevated pressure to start combustion in the combustion chamber despite a low total flow rate supplied by the pump 6. The initiation of the main injection provided by the main ramp 40 can then be required to attain a higher engine power setting, corresponding for the slide valve 20 to a transition from the second configuration to the third.

The embodiment which was just described uses a slide valve with a translational movement.

Illustrated in FIGS. 3 and 4a to 4c is an example of an embodiment with a slide valve 20, which in this particular case is a rotating slide valve.

The valve is of the DDV (or "direct drive valve") type. It includes a control assembly 60 with an electric motor and resolver module, for example an RVDT.

This control assembly and its motor drive the rotating slide valve 20 in rotation.

The set of notches 20a (FIGS. 4a, 4c) provided on said slide valve 20 allows, depending on the angular position of the piston 20, to have the feed port 54 communicate with, if applicable, the outlet port 33 which feeds the start-up ramp then, through the diversion 32a, with the intake area 41 of the outlet port 42 which feeds the main ramp.

To optimize as well as possible the divergence between the unit flow rate of the injectors of the start-up ramp and that of the injectors of the main ramp, the area 41 can be defined, along the stroke of the slide valve, by different successive slots of which the geometries correspond to distinct flow rate gains.

For example, the area 41 comprises three slots 43, 44 and 45 (FIG. 5):
- a trapezoidal slot 43 with small base L1, with large base L2 and height $e_1$, so that the flow area of the slot 43 is opened more and more rapidly during the stroke of the slide valve 20 on its axis X during transition to the third configuration (or around its axis of rotation), and therefore so as to obtain an increasing flue flow rate gain,
- a trapezoidal slot 44 with large base L2, with small base L3 and height $e_2$, so that the flow area of the slot 44 is opened more and more slowly during the stroke of the slide valve 20 on its axis X during transition to the third configuration, and therefore so as to obtain a decreasing fuel flow rate gain,
- a rectangular slot 45 with length $e_3$ along the axis X and width L3, so that the fuel flow rate varies linearly as a function of the displacement of the slide valve along its axis X.

As a guideline, the table below proposes an example of dimensions for these three slots:

| Length | Measurement (mm) |
|--------|------------------|
| $e_1$  | 0.10             |
| $e_2$  | 0.10             |
| $e_3$  | 0.35             |
| L1     | 1.00             |
| L2     | 2.00             |
| L3     | 0.20             |

Such a geometry allows different antagonistic objectives to be reconciled:
- it allow a rapid opening of the main orifice 41 for balancing as soon as possible the unit flow rates of the injectors of the start-up 30 and main 40 ramps during transition from to the third configuration,
- it guarantees a minimum pressure (5 bars for example) capable of ensuring good quality atomization at the start-up ramp 30, despite the pressure drop observed at this ramp during transition to the third configuration where the main ramp 40 begins to be fed.

It also allows a divergence between the unit flow rates at the injector outlet less than 10% over a major portion of the possible flow rate range.

Other geometries and dimensioning are possible, of course.

In particular, the slots can be rectangular or have more complex shapes.

Likewise, it is equally possible (as a complement to or independently of the use of an admission area toward the feed port of the main ramp including several slots with distinct geometries) to make use of the geometry and the dimensioning of the intake section toward the feed port of the start-up ramp.

FIG. 6 illustrates the performance obtained with a system of the type of that which has just been described with regard to this objective, in comparison with a system with known architecture, where a distributing valve commuting between an open position and a closed position, placed upstream of the main injection ramp, operates the distribution of the total metered flow rate for a metering unit between the injection ramps and controls the transition from the start-up phase to the phase where the main injection ramp is fed with fuel.

In particular, FIG. 6 compares graphically the divergence between the unit injector flow rates obtained for the two systems, over a total metered fuel flow rate range extending from 0 to 160 L/h.

The curves 210 and 220 show the unit flow rates of, on the one hand, the injectors of the start-up ramp 30 and, on the other hand, the injectors of the main ramp 40 in the case of the metering unit of FIG. 2 and the main orifice described in reference to FIG. 3.

The curves 230 and 240 show the unit flow rates of the injectors of the start-up ramp and of the injectors of the main ramp in the case of a system with a distributing valve.

The curve 250, for its part shows, as a function of the total flow rate, the divergence of the unit flow rate between the start-up and main injectors in the case of the metering unit of FIG. 2 and the main orifice described in reference to FIG. 3. The main injection ramp is fed from a total flow rate supplied to the combustion chamber of 20 L/h; a limited transition phase is observed between the state where only the start-up ramp is fed with fuel and the state where the main ramp is also fed, with a rapid homogenization of the injector unit flow rates. It is observed in particular that the divergence in injector unit flow rates is less than 10% for a total metered flow rate greater than 37 L/h.

The curve 260 corresponds to the curve 250, but in the case of a system with a distributing valve. The divergence curve is never greater than 10%.

Finally, shown in FIG. 7 are the pressures observed at the inlets of the injection ramps for a system conforming to the invention, over a total metered flow rate range extending from 0 to 140 L/h.

The curve 310 illustrates the pressure at the inlet of the start-up ramp, and the curve 320 illustrates the pressure at the inlet of the main ramp.

The main injection ramp is, there too, fed from a total metered flow rate of 20 L/h; it is observed that, for a total metered flow rate greater than this threshold, a minimum pressure of 5 bars at the inlet of the start-up ramp is ensured by the system, which allows good atomization quality at the start-up ramp to be guaranteed over the entire period of the transition from the start-up phase to a higher engine power setting.

The invention claimed is:

1. A fuel metering and distribution unit, capable of controlling the fuel feed of a start-up injection ramp and of a main injection ramp in a combustion chamber of a turbine engine,
including a multi-outlet metering device comprising in a sleeve:
   a movable slide valve,
   a feed port for the fuel flow rate to be distributed at least between the start-up injection ramp and the main injection ramp,
   a first outlet port feeding the start-upstart-up ramp through a flow area on a span of the slide valve,
   a regulator regulating the pressure differential between this outlet port and the feed port, so as to obtain, at the flow area, a metered total flow rate that is a function of a control current,
   a second outlet port feeding the main ramp,
wherein the second outlet port is fed through a set of slots, said set of slots being situated on a span of the slide valve other than that where said flow area of the outlet port feeding the start-upstart-up ramp is situated, and being fed by the first outlet port feeding the start-upstart-up ramp, the second outlet port thus being able to receive a portion of the total metered flow rate,
said set of slots being more or less open depending on the position of the slide valve, so that the flow area defined by said set of slots varies and the distribution of flow rate between the start-upstart-up ramp and the main ramp varies as a function of the control current,
the slide valve and the set of slots being configured with geometries, dimensions and positions such that:
   in a first range of displacement of the slide valve, the flow area which feeds the first outlet port of the start-upstart-up ramp is progressively opened with the displacement of the slide valve, while the area of the set of slots which feeds the second outlet port of the main ramp is closed,
   then, in a second range of displacement of the slide valve, the area of the set of slots which feeds the second outlet port of the main ramp is progressively opened with the displacement of the slide valve, so that a portion of the metered flow rate at the flow area which feeds the first outlet port of the start-upstart-up ramp can be supplied to the main ramp, while said flow area is kept open, wherein the sleeve of the multi-outlet metering device also comprises an intake area, located between the flow area of the first outlet port and the set of slots, so that the intake area is in fluid communication with the set of slots in the second range of displacement of the slide valve,
the feeding of the set of slots by the first outlet port being allowed, on said second range of displacement of the slide valve, by a diversion branch extending between said intake area and the first outlet port.

2. The fuel metering and distribution unit according to claim 1, wherein the slide valve and the set of slots are configured with geometries, dimensions and positions such that the divergence between the unit flow rate of the injectors of the start-up ramp and that of the injectors of the main ramp is less than 10% beyond a given total fuel flow rate threshold.

3. The fuel metering and distribution unit according to claim 1, wherein the slide valve and the set of slots are configured with geometries, dimensions and positions for maintaining a minimum pressure at the inlet of the start-up injection ramp while the main ramp begins its opening.

4. The fuel metering and distribution unit according to claim 3, wherein the minimum pressure is 2.5 bars.

5. The fuel metering and distribution unit according to claim 1, wherein the set of slots has the following succession of slots:
   one slot with an increasing flow rate gain as the orifice opens,
   one slot with a decreasing flow rate gain,
   one slot where the flow rate increases linearly as a function of the displacement of the slide valve along its axis.

6. The fuel metering and distribution unit according to claim 1, wherein the movable slide valve has a linear displacement.

7. The fuel metering and distribution unit according to claim 1, wherein the movable slide valve is of the rotating type.

8. A fuel system for a turbine engine comprising a metering and distribution unit according to claim 1.

9. A turbine engine comprising a combustion chamber and a fuel system according to claim 8.

* * * * *